US010356986B2

(12) United States Patent
Burmann

(10) Patent No.: US 10,356,986 B2
(45) Date of Patent: *Jul. 23, 2019

(54) DETACHABLE AND COLLAPSIBLE PALLET BOX

(71) Applicant: Frank Joseph Burmann, Round Rock, TX (US)

(72) Inventor: Frank Joseph Burmann, Round Rock, TX (US)

( * ) Notice: Subject to any disclaimer, the term of this patent is extended or adjusted under 35 U.S.C. 154(b) by 322 days.

This patent is subject to a terminal disclaimer.

(21) Appl. No.: 15/487,399

(22) Filed: Apr. 13, 2017

(65) Prior Publication Data

US 2017/0215348 A1   Aug. 3, 2017

Related U.S. Application Data

(63) Continuation of application No. 14/038,761, filed on Sep. 27, 2013, now Pat. No. 9,655,307.
(Continued)

(51) Int. Cl.
*A01G 9/02* (2018.01)
*B62B 3/02* (2006.01)
(Continued)

(52) U.S. Cl.
CPC ............... *A01G 9/02* (2013.01); *A01G 9/021* (2013.01); *A01G 9/029* (2018.02); *B62B 3/002* (2013.01); *B62B 3/02* (2013.01); *B65D 19/06* (2013.01); *B65D 19/42* (2013.01); *B62B 3/004* (2013.01); *B62B 2202/50* (2013.01); *B62B 2202/70* (2013.01); *B65D 2519/008* (2013.01); *B65D 2519/00024* (2013.01); *B65D 2519/00029* (2013.01); *B65D 2519/00034* (2013.01); *B65D 2519/00059* (2013.01);
(Continued)

(58) Field of Classification Search
CPC ... A01G 9/00; A01G 9/02; A01G 9/10; A01G 9/12; A01G 9/14; A01G 9/16; B65D 19/06
See application file for complete search history.

(56) References Cited

U.S. PATENT DOCUMENTS 4,363,189 A * 12/1982 O'Donnell, III ....... A01G 9/029
47/73
5,279,423 A * 1/1994 Shuert .................. B65D 5/4266
206/524.2
(Continued)

*Primary Examiner* — Thanh Pham
(74) *Attorney, Agent, or Firm* — Ding Yu Tan

(57) ABSTRACT

A planter box configured for housing plantings is disclosed. The pallet box assembly includes a pallet base, two side panels, a front panel, and a rear panel, which are collapsible and reusable. Pallet base has tenon joint parts with locking mechanisms that extend out. Pallet base has an opening extending therethrough for ease of handling by pallet jack or hand truck. The side panels include grooves. Front and rear panels include tenon joint part with locking mechanism. The side panels are identical and interchangeable, the front panel is identical and interchangeable with the rear panel. Each locking mechanism includes a winged bolt threadedly inserted and engaged into the tenon joint part, and a wing which is rotated by about 45 to 135 degrees to engageably and securely attach the corresponding tenon joint part in the corresponding groove, so that the pallet box assembly is securely installed.

11 Claims, 13 Drawing Sheets

Related U.S. Application Data

(60) Provisional application No. 61/848,438, filed on Jan. 4, 2013.

(51) Int. Cl.
*A01G 9/029* (2018.01)
*B62B 3/00* (2006.01)
*B65D 19/06* (2006.01)
*B65D 19/42* (2006.01)

(52) U.S. Cl.
CPC .............. *B65D 2519/00064* (2013.01); *B65D 2519/00069* (2013.01); *B65D 2519/00154* (2013.01); *B65D 2519/00542* (2013.01); *Y10T 29/49815* (2015.01); *Y10T 29/49826* (2015.01); *Y10T 29/49948* (2015.01)

(56) References Cited

U.S. PATENT DOCUMENTS

| | | | | |
|---|---|---|---|---|
| 6,681,522 B2 * | 1/2004 | Marchioro | ............. | A01G 9/027 47/65.5 |
| 2007/0000923 A1 * | 1/2007 | Chen | ........................ | B65D 7/12 220/4.33 |
| 2010/0192459 A1 * | 8/2010 | Cottier | ..................... | A01G 9/02 47/65.7 |
| 2012/0152798 A1 * | 6/2012 | Allegretti | ............... | B65D 19/06 206/599 |
| 2014/0013663 A1 * | 1/2014 | Shein | ........................ | A01G 9/02 47/66.1 |

* cited by examiner

DETACHABLE AND COLLAPSIBLE PALLET BOX

BACKGROUND OF THE INVENTION

1. Technical Field

This disclosure relates to a pallet box assembly, and particularly, to a detachable and collapsible pallet box which provides a durable but detachable and reusable container box having structural features of a pallet, which can be used for housing plantings.

2. Description of Related Art

There has been a trend in various local communities towards gardening using planter boxes. Indeed, planter boxes are a popular choice for gardening in small confined spaces. The planter box can be used to grow flowers, herbs, and vegetables in areas such as decks, patios, and balconies. The planter box can be made of a cedar box supported by a wood frame. Since cedar has good outdoor rot resistance, it has become a good choice for planter boxes. It is also untreated which means that toxins won't leach out of the cedar box into the vegetables. Some larger-sized planter boxes can be used to house larger plantings, such as trees and shrubs. A planter box may even have wheels for easy mobility. Other than cedar and redwood, planter boxes can be made of various other materials, such as PVC plastic. Over the years, there are numerous do-it-yourself (DIY) planter boxes built by many people, typically using wood materials for such projects. However, these wooden planter boxes typically takes significant time to fabricate, degrades over an extended period of time due to weathering, cannot be disassembled or detached, and some of the panels cannot be removed or disassembled during normal usage. Meanwhile, most of the commercially available plastic planter boxes are also typically not detachable or removable. In addition, both the wooden and the plastic commercially available planter boxes do not have sufficient structural features that would allow for the use of pallet jacks or hand trucks for transporting of the planter box during normal use. Other issues commonly faced are that traditional methods of removing plants from traditional planters often cause damage to the plants and containers. In fact, larger commercial planters are often simply destroyed and damage the roots during the process of removing large plants, such as trees for example. Although some conventional planter boxes have been available to the market with removable side panels, they do not integrate a method for easy transportation such as a pallet or integrated wheels. Indeed nurseries often place large planters directly on top of a pallet thus creating unnecessary work without the benefit of binding the planter to the pallet or having a collapsible and reusable planter.

In the conventional art relating to collapsible planter boxes, there is not a collapsible planter box that is commercially available which provides an adequate method to protect the germinated plant from frost, birds, or pests via a plastic green house or protective bird or bug netting. Meanwhile, although there are many products on the market to help facilitate the germination of seed and growing them into mature plants, there are no integrated systems which are useful and effective at all stages of growth of the plant from seedling all the way to a mature plant.

Therefore, there is a need in the industry for an improved reusable planter box with capabilities of providing convenient removal of one or more of the panels thereof without having the entire planter box collapsing during use, and offering improved transporting stability during handling by using a fork truck, forklift, hand pallet jack, or hand truck.

SUMMARY OF THE INVENTION

An object of present invention is to provide a detachable and collapsible planter box in the form of a pallet box which provides a durable but detachable and reusable planter box structure with structural features of a pallet, which can be used for housing plantings.

Another object of the present invention is to provide a pallet box which is capable of offering a convenient method for partial removal, i.e. just one or more of the panels but not all of the panels, for example, a side panel, a side panel and a front panel, a side panel and a rear panel, or both side panels, so as to allow access to the filled potted soil from each of the exposed sides of the pallet box.

Another object of the present invention is to provide a pallet box which is capable of easy detachment and removal of all panels, i.e. both side panels and both the front panel and the rear panel so that the disassembled panel pieces for the pallet box assembly can be conveniently and efficiently packed for shipping.

Another object of the present invention is to provide a pallet box which is capable of disassembling into individual panels to allow for flat-packing for efficient shipping.

Another object of the present invention is to provide a pallet box to function, serve or perform as a detachable and reusable planter box that is durable enough to perform satisfactorily under outdoor usage conditions for an extended duration of at least 5 years.

Another object of present invention is to provide a pallet box assembly which can be securely and conveniently transported by using a fork truck, forklift, hand pallet jack, or hand truck.

Another object of present invention is to provide a pallet box which includes a plurality of PVC pipe attachment blocks for configuring a plurality of PVC pipes serving as additional structure features such as seed germination and starter plant holders, a canopy, rain and sun cover, or plant cover in the form of bird netting, bug netting, sun shading, or terrarium "greenhouse" cover for the pallet box assembly.

Another objective of present invention is to provide a maximum amount of soil aeration during all stages of plant growth form sprout to fully grown plant.

Another object of present invention is to provide a pallet box which have panels that have a plurality of vertical grooves formed on the inside surface of the side panels, the front panel, and the rear panel so as to prevent tangled roots.

Another object of present invention is to provide a pallet box which have panels that can be added or removed without requiring the lifting or removal of the contents held therein. In fact, the object or device being transported can easily be inspected or even used without breaking the container or removing the object from the pallet. This may have benefit in the ease of inspecting cargo or even using a piece of machinery housed inside and bolted to the pallet and transported to various field locations.

Another objective of present invention is to provide workman a lockable box for tools and equipment that is easily transported and provide shelter from weather elements in the form of a sun and rain canopy.

BRIEF DESCRIPTION OF THE DRAWINGS

FIG. 1 shows a perspective assembly view of a pallet box according to a first embodiment along with exterior foam insulation panels being added on.

DETAILED DESCRIPTION OF THE EMBODIMENTS

Figure 1:
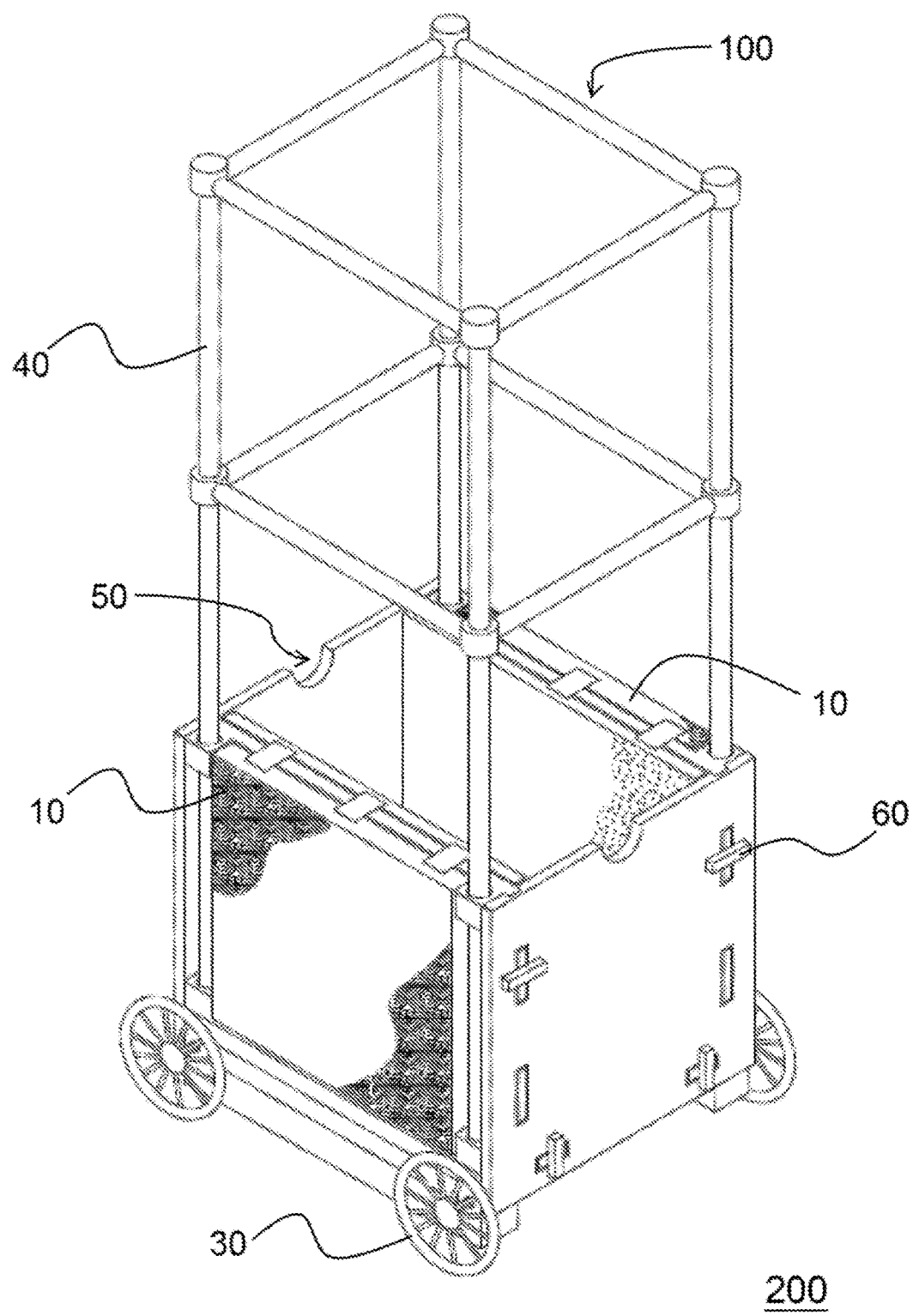

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

According to a first embodiment as shown in FIGS. 1-7, a pallet box 200 includes a pallet base 90; the pallet base 90 has four tenon joint parts 70 that extend out from two side surfaces of the pallet base 90, each of the tenon joint part 70 includes one locking mechanism 60. The pallet box 200 further includes two side panels 120, a front panel 230 and a rear panel 240. The pallet box 200 can be fully adapted for use as a planter box for home gardening, housing plantings or for horticultural industrial shipping of plants.

Figure 2:
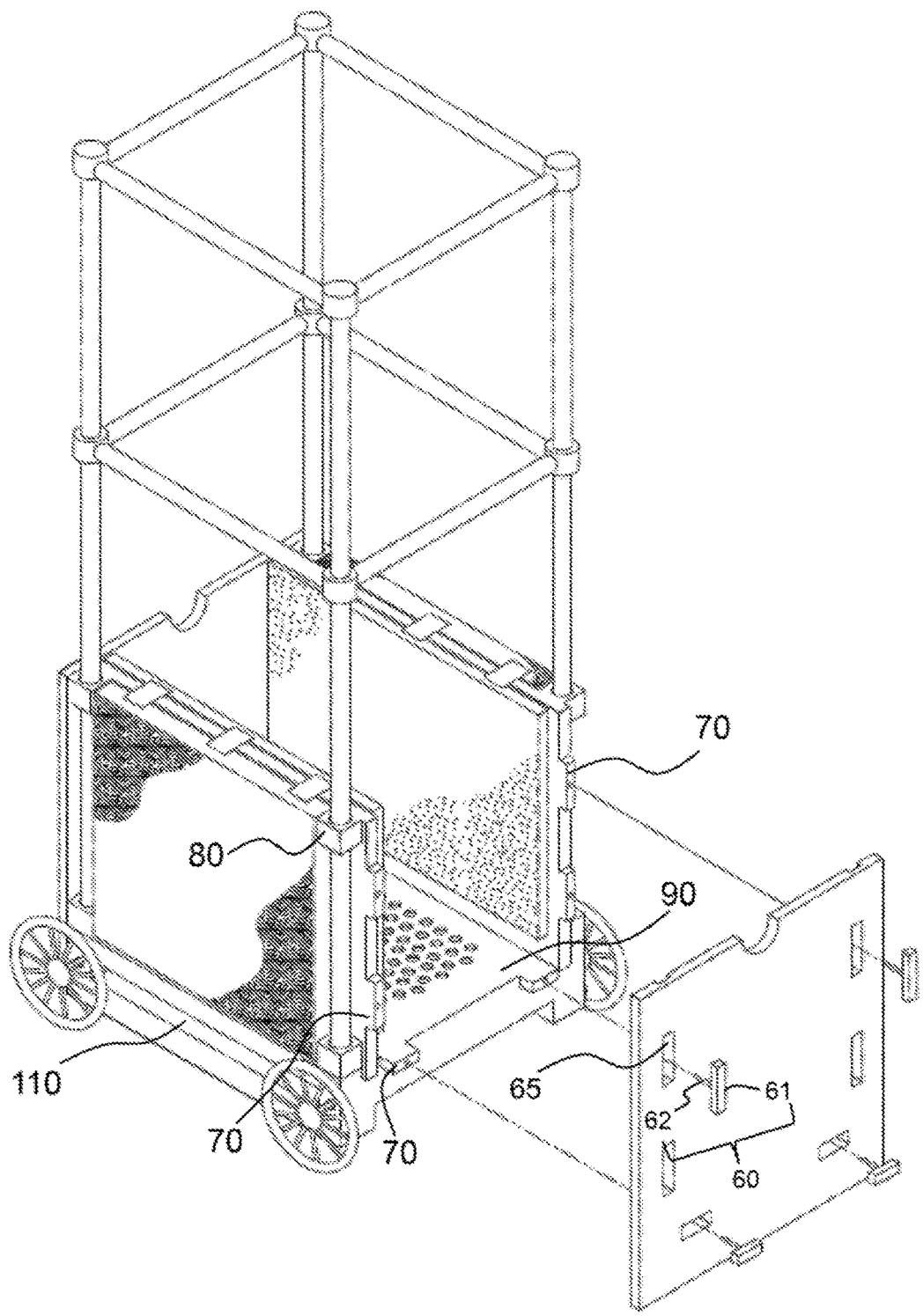
FIG. 2 shows a perspective partial exploded view of the pallet box of FIG. 1 according to the first embodiment.

The locking mechanism 60 of each tenon joint part 70 includes a threaded winged bolt 62, which is threadedly inserted and engaged into the tenon joint part 70 as shown in FIGS. 1 and 2. The wings 61 of the locking mechanism 60 can be made into the shape of a rectangular block, a flat plate, a pearl wing nut, etc. Each of the side panel 120 includes four grooves 65, in which two of the four grooves 65 are arranged horizontally adjacent to the bottom edge of the side panel 120, one of the four grooves 65 is arranged vertically adjacent to one edge of the side panel 120 (located closer to the front panel 230), and one of the four grooves 65 is arranged vertically adjacent to another edge of the side panel 120 (located closer to the rear panel 240). The front panel 230 has two tenon joint parts 70 that extend out from two side surfaces of the front panel 230, each of the tenon joint part 70 includes one locking mechanism 60. The rear panel 240 has two tenon joint parts 70 that extend out from two side surfaces of the rear panel 240, each of the tenon joint part 70 includes one locking mechanism 60. In addition, the front panel 230 has another two tenon joint parts 70 that extend out from two side surfaces of the front panel 230 and are located below the two corresponding tenon joint parts 70 that have the locking mechanisms 60, respectively, each of the another two tenon joint parts 70 does not include any locking mechanism. Likewise, the rear panel 240 has another two tenon joint parts 70 that extend out from two side surfaces of the rear panel 240, and are located below the two corresponding tenon joint parts 70 that have the locking mechanisms 60, respectively, each of the another two tenon joint parts 70 does not include one locking mechanism. Each of the locking mechanisms 60 of the front panel 230, the rear panel 240, and the pallet base 90 can be inserted through one corresponding groove 65 of the side panel 120, so that the tenon joint parts 70 are inserted and fittingly engaged with the corresponding groove 65 formed on the side panel 120 to form a tongue and groove joint. Furthermore, each wing 61 for each locking mechanism 60 can be rotated by about 45 to 135 degrees in either clockwise or counterclockwise direction so as to engageably, snugly and securely attach the corresponding tenon joint part 70 in the corresponding groove 65. The completely-installed pallet box 200 has the front panel 230 and the rear panel 240 configured directly on top of the pallet base 90, and the side panels 120 thereof configured to have their bottom surfaces to be above ground level as much as possible considering the material strength surrounding the groove 65 areas.

Figure 3:
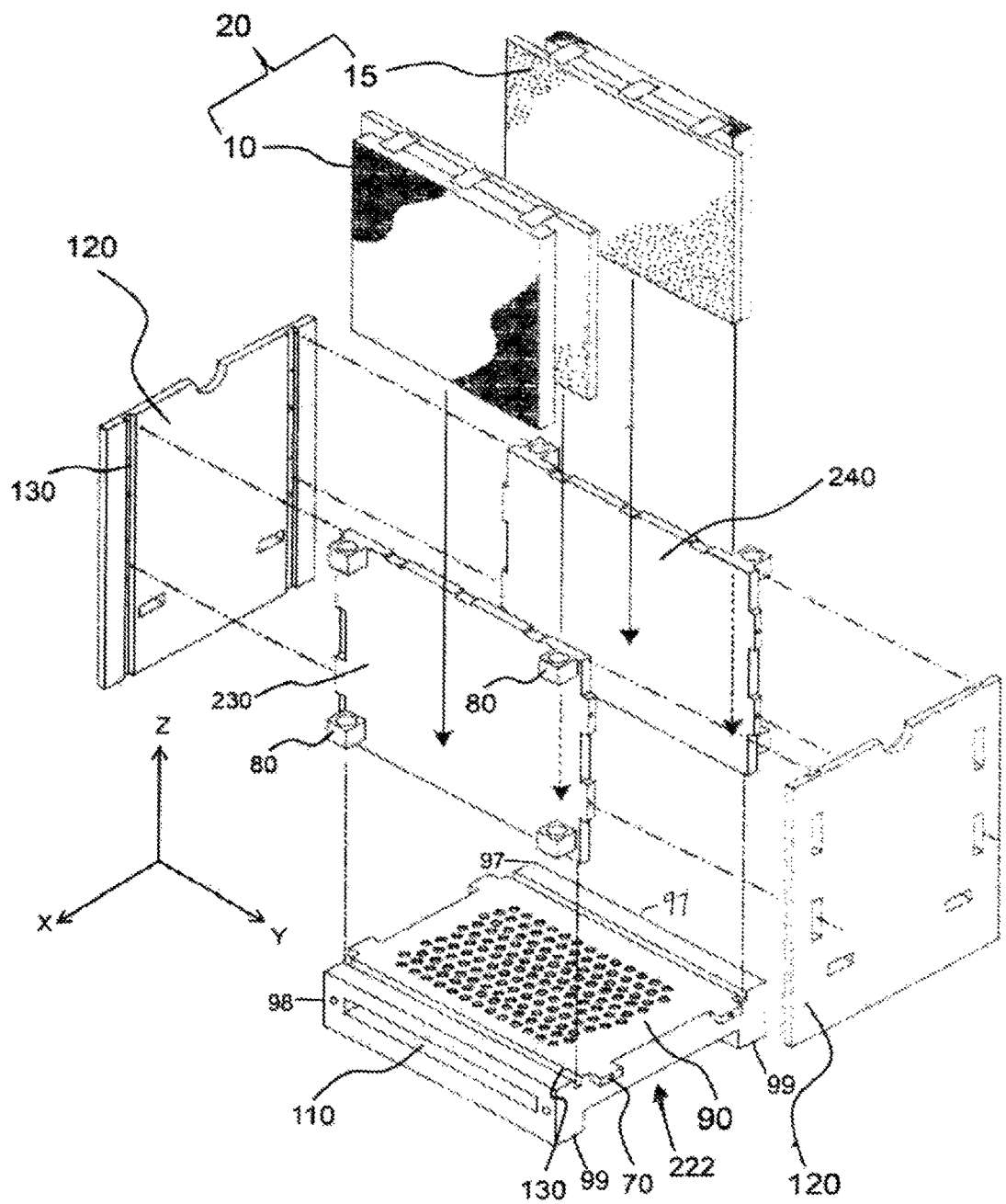
FIG. 3 shows a fully exploded view of the pallet box of the first embodiment.

In this embodiment, the front panel 230 and the rear panel 240 can each have an exterior foam insulation panel 10 and an interior natural matting panel 15 that are attached and combined together to form an insulation assembly 20 to be fittingly installed as shown in FIGS. 1, 2, and 3 as optional add-on features to the pallet box 200. In addition, each side panel 120 can also include a semi-circular groove 50 at the middle top portion thereof. The pallet box 200 can also include a PVC frame structure 100. PVC is abbreviation for polyvinyl chloride plastic. The PVC frame structure 100 includes a plurality of PVC pipes 40. Each PVC pipe 40 is securely mounted through a plurality of attachment blocks 80, and each attachment block 80 has a hole therethrough that is slightly larger than or substantially the same as the diameter of the PVC pipe 40. The attachment blocks 80 are integrally formed on the front panel 230 and the rear panel 240, respectively. The pallet base is defined by a front edge, a back edge, and two side edges as shown in FIG. 3.

In this embodiment, the pallet base 90 has a plurality of shallow border grooves 130 (see FIG. 3) configured along the edges thereof adjacent to the front panel 230 and the rear panel 230, respectively, so as to allow more secured interlocking of the panels together to form an improved fit after assembly is completed, as shown in FIG. 1.

Referring to FIG. 3, the pallet base 90 is configured with an opening 110 extending all the way therethrough. The pallet base 90 also includes a plurality of horizontal legs 99 extending downwardly along an edge of the pallet base 90 at both a front edge 98 and a back edge 97 of the pallet base 90. There are two horizontal legs 99 in total. The horizontal legs 99 are arranged parallel with the front panel 230. The opening 110 of the pallet base 90 is a through opening extending through the horizontal legs 99 from the front edge 98 to the back edge 97 of the pallet base 90. The opening 110 is preferably configured to allow a pallet jack, fork lift, or a similar lifting device to gain access to the pallet box 200 from at least two sides, namely the front side and back side, thereby allowing for at least two way entries. The width of the opening 110 of the pallet base 90 can be 18 inches or smaller, including 16.5 inches but are not limited thereto. Based on the designed structural features of the pallet base 90 incorporating the opening 110 as shown in FIG. 3, the structural features of a pallet are being adapted to the pallet box 200 for ease of handling by pallet jack or hand truck, etc. In addition, a second opening 222 is a through opening extending along a bottom portion on a plurality of sides of the pallet base 90 disposed directly below the side panels 120 of the pallet box 200, and the second opening 222 is located in between the horizontal legs 99.

Referring to FIGS. 4-9, in this embodiment, the pallet box 200 can have several additional add-on optional accessories installed thereon, including but not limited to, a clear canopy cover (a thick poly. bag, as an example) 140, a meshed carriage tray 150, a rectangular hole-filled carriage tray 160, a seed carriage assembly 170, an aeration base 180, a matting or sponge 195, a drainage pan 190, and a top cover 210.

In this embodiment, different sizes of the pallet box 200 can be fabricated. The overall size of the pallet box 200 can be based upon those of North American, European Union, or ISO standardized size dimensions, i.e. 4 ft×4 ft pallets, and even a garden wagon in size. The pallet box 200 can be made of materials such as wood, particleboard, plastic, and metal. The plastic material for the pallet box 200 can also include recycled plastic material, and also UV weatherable grade plastic material. As a result, the pallet box 200 is durable enough to perform satisfactorily under outdoor usage conditions for an extended duration of at least 5 years.

Referring to the first embodiment, during testing, the rear panel 240 of the pallet box 200 is directly contacting the vertical bar of the hand truck when tilting the pallet box 200 for maximum efficiency and weight distribution.

Meanwhile, as shown in FIG. 1, a plurality of wheels 30 (which can be of different sizes to choose from) can be configured to the pallet box 200, which in essence, turns the pallet box 200 into a wagon, cart, dolly, or trailer vault.

Figure 4:
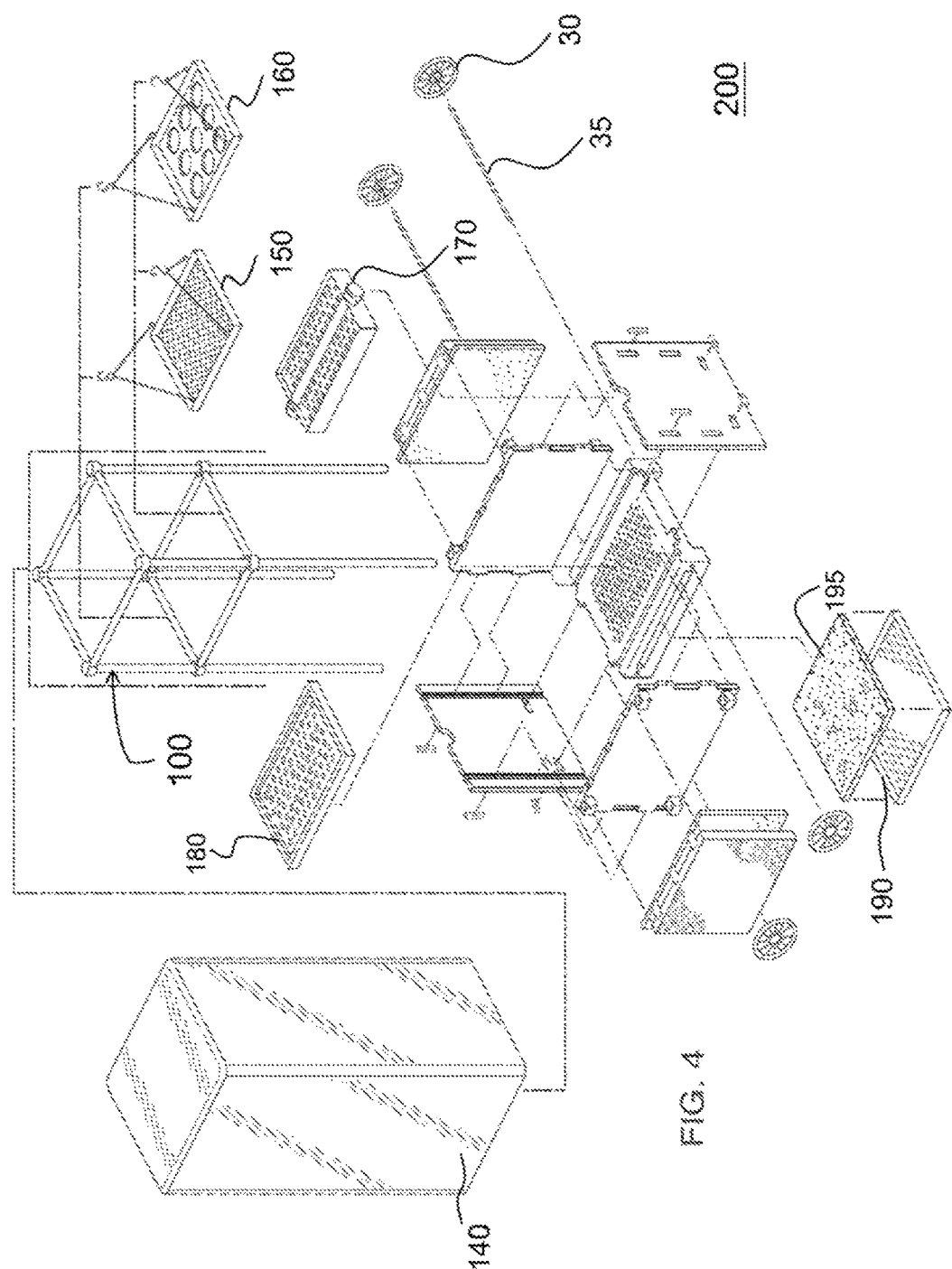
FIG. 4 shows an exploded perspective view of the pallet box assembly of the first embodiment which is further configured with several different add-on accessories and optional features.
Figure 5:
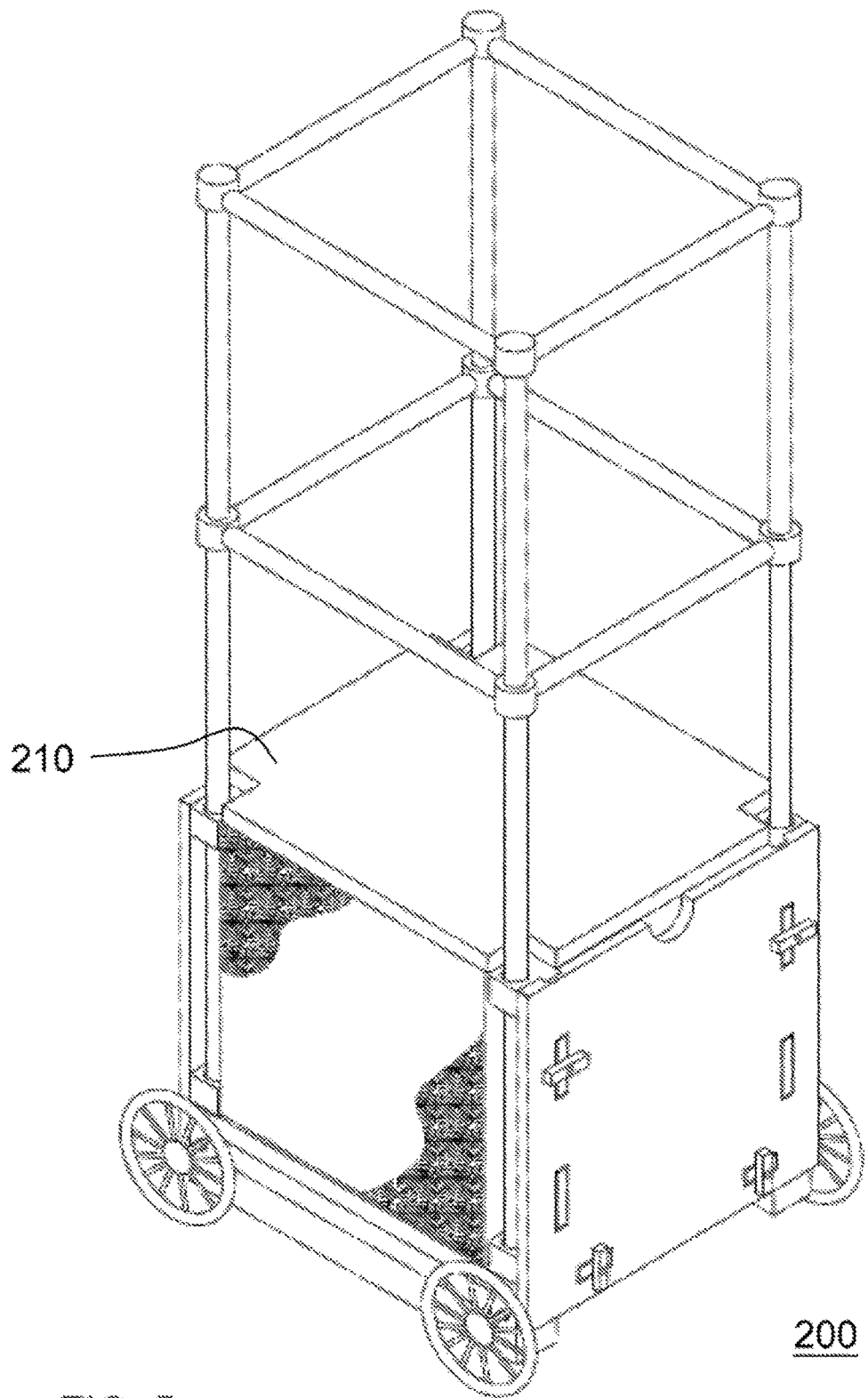
FIG. 5 shows a perspective view of the pallet box of the first embodiment being further installed with a top cover.

Referring to FIGS. 3-4, in the first embodiment, a plurality of axles 35 are configured on the bottom of the pallet base 90 at each corner thereof, which later on, the wheels 30 can be detachably-attached so that the pallet box 200 thereby becomes a cart or a wagon. The wheels 30 are not fixedly-attached to the pallet box 200 because the wheels 30 can be easily detached or removed based upon specific needs or occasions as required by user.

Figure 8:
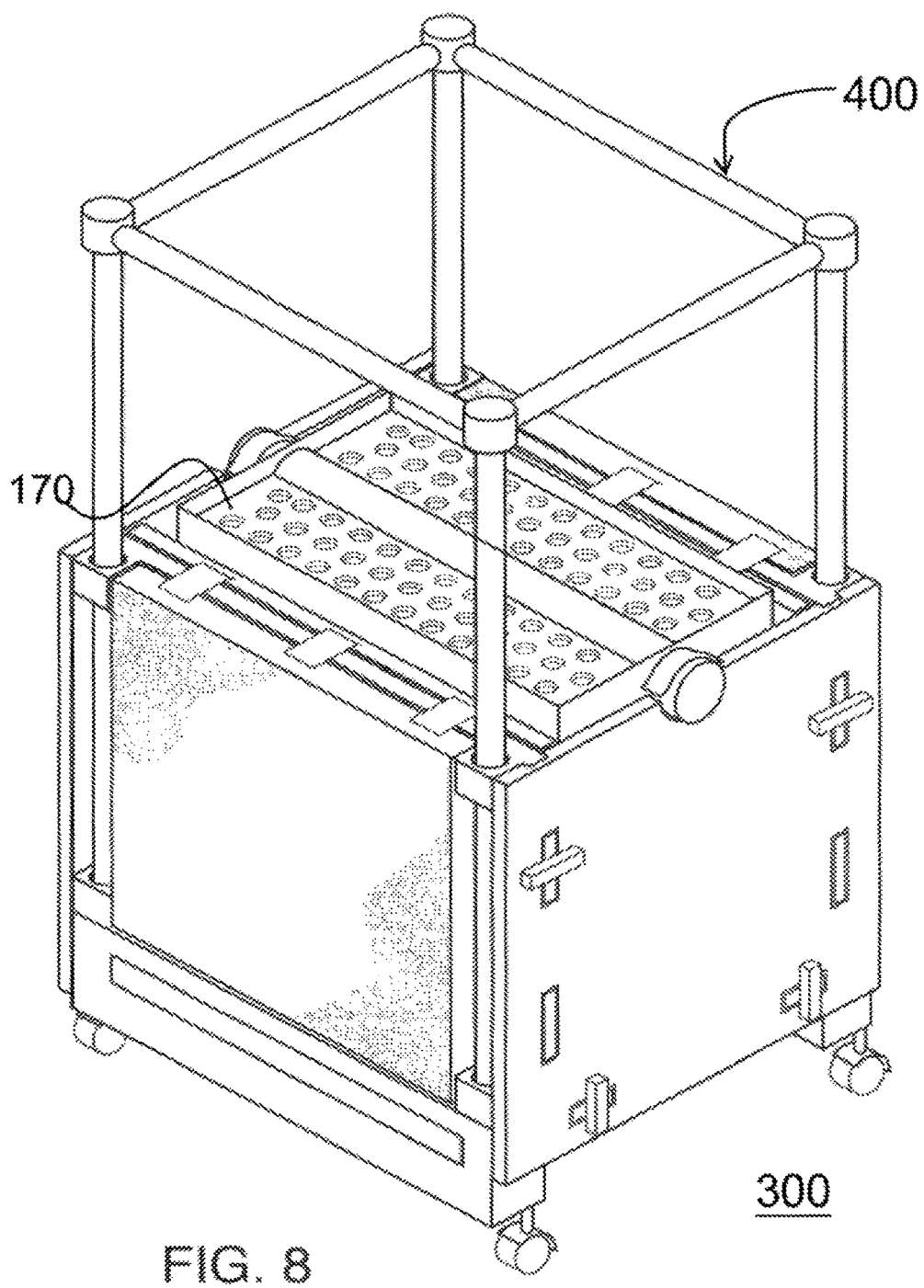
FIG. 8 shows a perspective view of a pallet box of a second embodiment comprising a seed carriage assembly and a PVC frame.
Figure 9:
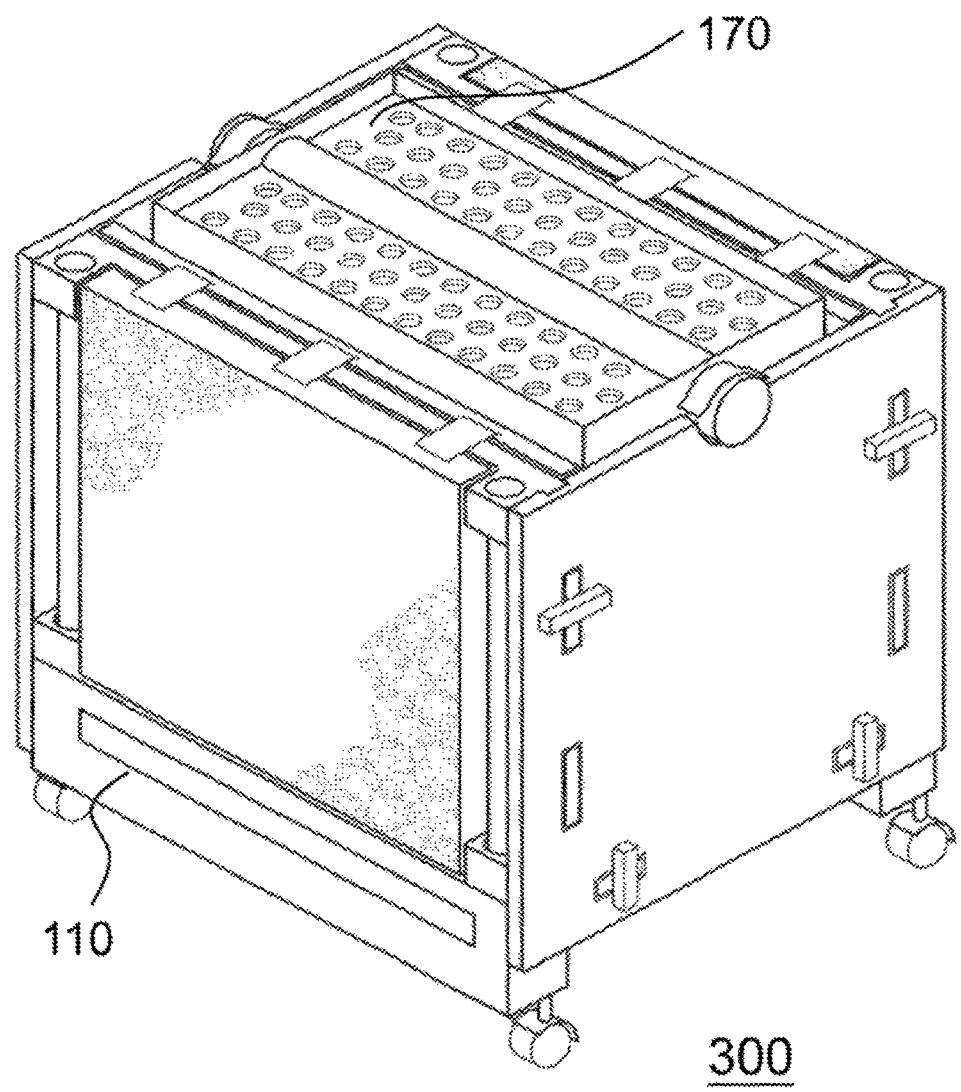
FIG. 9 shows a perspective view of the pallet box of FIG. 8 with the PVC frame being removed.

Referring to FIG. 8 and FIG. 9, a plurality of receptacle holes are arranged on the bottom of the pallet base 90 under each corner so that a plurality of fixed caster wheels (not labeled) can be configured, thus creating a dolly configuration for fabricating a modified pallet box configuration of the first embodiment.

Figure 12:
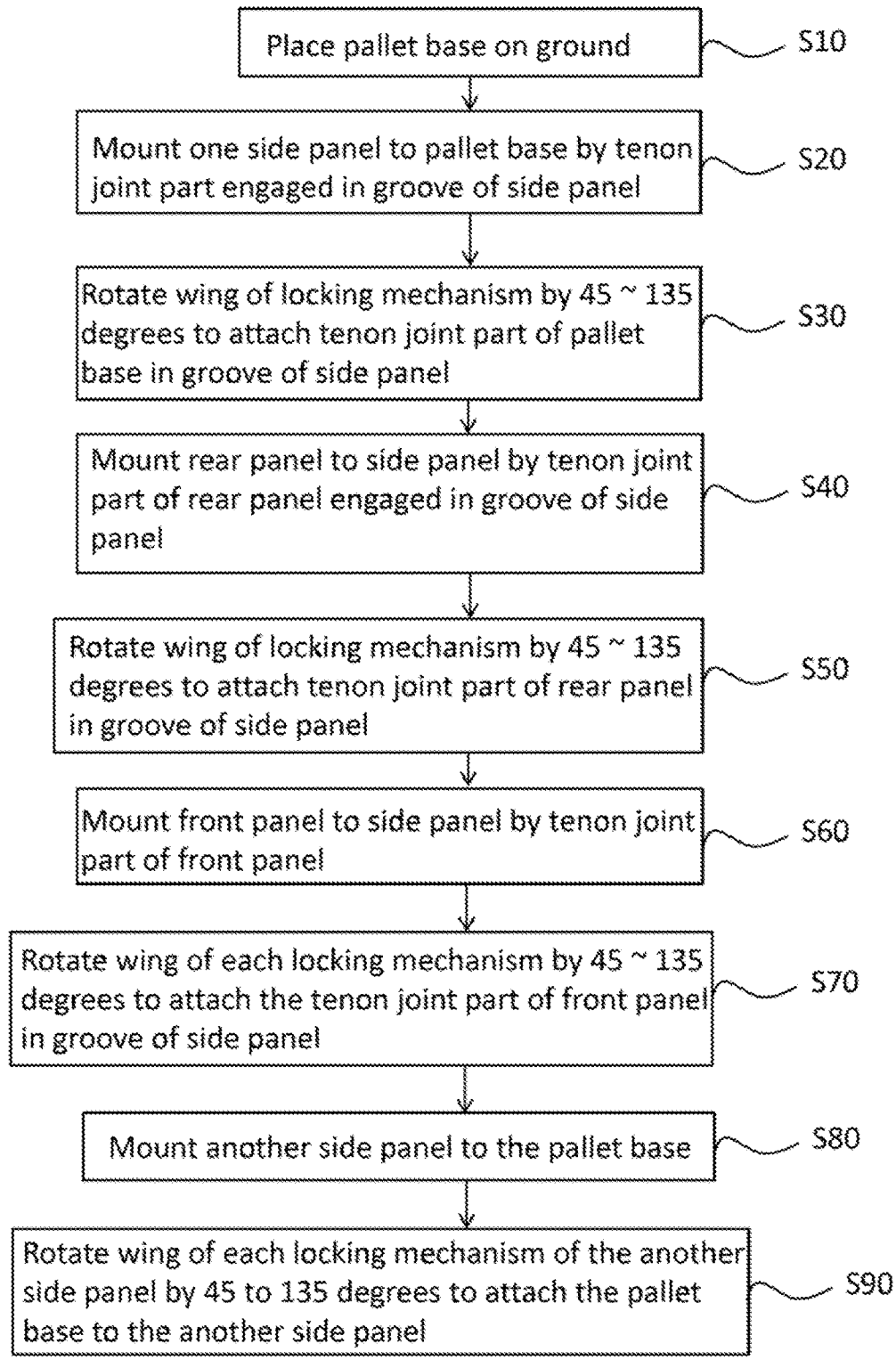
FIG. 12 shows an installation method of the pallet box of the first embodiment.

Referring to FIG. 12, an installation method of the pallet box 200 of the first embodiment includes the following steps: Step S10: The pallet base 90 is placed on the ground at a desired location. Step S20: One of the side panels 120 is fittingly mounted to the pallet base 90 by means of the pair of tenon joint parts 70 of the pallet base 90 fittingly engaged in the pair of grooves 65 of the side panel 120, respectively. Step S30: Each wing 61 configured at the end of the threaded winged bolt 62 of each locking mechanism 60 that is threadedly-attached to each tenon joint part 70 of the pallet base 90 is rotated by about 45 to 135 degrees in either clockwise or counterclockwise direction so as to engageably, snugly and securely attach the corresponding tenon joint part 70 of the pallet base 90 in the corresponding groove 65 of the one side panel 120. Step S40: The rear panel 240 is fittingly mounted to the one side panel 120 by means of one tenon joint part 70 of the rear panel 240 fittingly engaged in one of the grooves 65 of the one side panel 120. Step S50: Each wing 61 together with the long threaded winged bolt 62 of each locking mechanism 60 that is threadedly-attached to each tenon joint part 70 of the rear panel 240 is rotated by about 45 to 135 degrees in either clockwise or counterclockwise direction so as to engageably and securely attach the corresponding tenon joint part 70 of the rear panel 240 in the corresponding groove 65 of the one side panel 120. Step S60: The front panel 230 is fittingly mounted to the one side panel 120 by means of one tenon joint part 70 of the front panel 230 fittingly engaged in one of the grooves 65 of the one side panel 120. Step S70: Each wing 61 along with the long threaded winged bolt 62 of each locking mechanism 60 that is thready-attached to each tenon joint part 70 of the front panel 230 is rotated by about 45 to 135 degrees in either clockwise or counterclockwise direction so as to engageably and securely attach the corresponding tenon joint part 70 of the front panel 230 in the corresponding groove 65 of the one side panel 120. Step S80: An another side panel 120 is fittingly mounted to the pallet base 90 by means of having the pair of tenon joint parts 70 of the pallet base 90 fittingly engaged in the pair of grooves 65 of the other side panel 120, respectively, and having the tenon joint parts 70 of both of the front and rear panels 230, 240 fittingly engaged in the vacant grooves 65 of the another side panel 120, respectively. Step S90: Each wing 61 of each locking mechanism 60 located at the surface of the another side panel 120 is rotated by about 45 to 135 degrees in either clockwise or counterclockwise direction so as to engageably, snugly and securely attach the pallet base 90 to the another side panel 120, respectively.

After the above installation method of the pallet box 200 has reached completion, the pallet box 200 is assembly with all of the corresponding tenon joint parts 70 fittingly engaged and securely locked in place in the corresponding grooves 65 by using the corresponding locking mechanism 60, in which each of the wings 61 is firmly abutted against the surface of the side panel 120, thereby preventing the pallet box from detachment thereof. Furthermore, an optional step can be performed after the completion of the above installation method as follow: the exterior foam insulation panel 10 and the interior matting panel 15 are fittingly installed on the front panel 230 and on the rear panel 240 respectively as shown in FIGS. 1, 2, and 3.

For ease of construction, the pallet box of the embodiments of instant disclosure can have the side panels to be identical and interchangeable, and the front panel to be identical and interchangeable with the rear panel.

Figure 13:
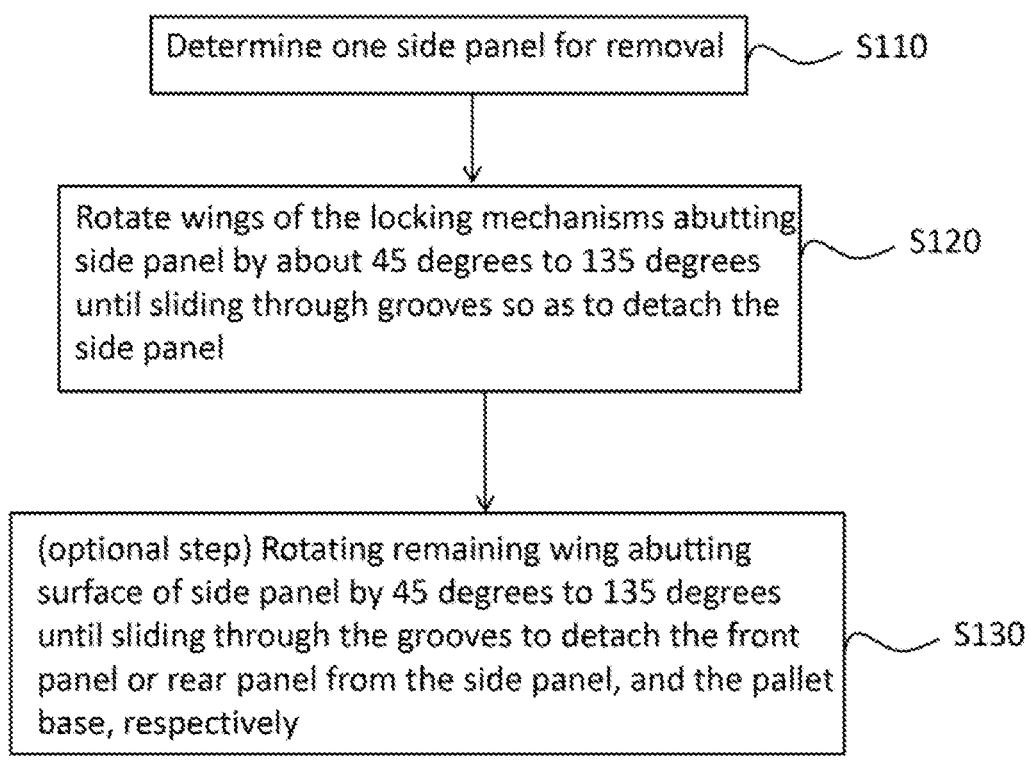
FIG. 13 shows a partial removal method of the pallet box.

A partial removal method of the pallet box 200 includes the following steps as shown in FIG. 13: Step S110: Determine one side panel 120 for removal. Step: S120: Rotate the wings 61 of the locking mechanisms 60 that are abutting the surface of the side panel 120 by about 45 to 135 degrees in either clockwise or counterclockwise direction until the wings 61 are able to slide through the corresponding grooves 65 so as to detach the side panel 120 from the pallet base 90, the front panel 230, and the rear panel 240, respectively. Step S130 (optional step): For removal of either the front panel 230 or the rear panel 240, rotate the remaining wing 61 that is abutting the surface of the side panel 120 by about 45 to 135 degrees in either clockwise or counterclockwise direction until the wings 61 are able to slide through the corresponding grooves 65 so as to detach the front panel 230 or the rear panel 240 from the side panel 120, and the pallet base 90, respectively. Field tests of an embodiment show that one side panel can easily be removed without affecting the front and rear panels, and the pallet base, and two side panels may be removed when a frame array is added.

In the illustrated embodiment as shown in FIGS. 1-7, the pallet box 200 includes the attachment blocks 80 for mounting the PVC pipes 40. Each of the (PVC pipe) attachment block 80 includes a through hole running through the vertical (height/longest) direction thereof. The diameter of the through hole is substantially of the same diameter as the PVC pipe 40 so as to ensure proper fit of the PVC pipe 40 therethrough. Four (PVC pipe) attachment blocks 80 can be formed on each of the corner of the front panel 230 and the rear panel 240, respectively. The PVC pipes 40 can be in ½ inch or ¾ inch in diameter. For home use applications, the ½ inch PVC pipe can be simply slipped down to fit the ¾ inch PVC pipe couplings attached to the front and rear panels 230, 240, and down into a plurality of recessed holes 220 on the top of the pallet base 90 (see FIG. 11). In a slightly upgraded or modified version of this embodiment, telescopic tent poles can be run on the inside of the panels. In an even sturdier embodiment, two of the inside PVC pipes 40 can be recessed and locked into several key holes on the pallet base 90. With the erection of all four PVC pipes 40 into the pallet base, having one PVC pipe 40 firmly installed at each corner of the pallet base 90, the pallet box 200 can still sufficiently provide access and reach from the top or the sides. There are a number of different ways of connecting the PVC pipes 40 to the pallet box 200 depending on factors such as cost consideration, aesthetics, and how much strength and rigidity is required.

Figure 11:
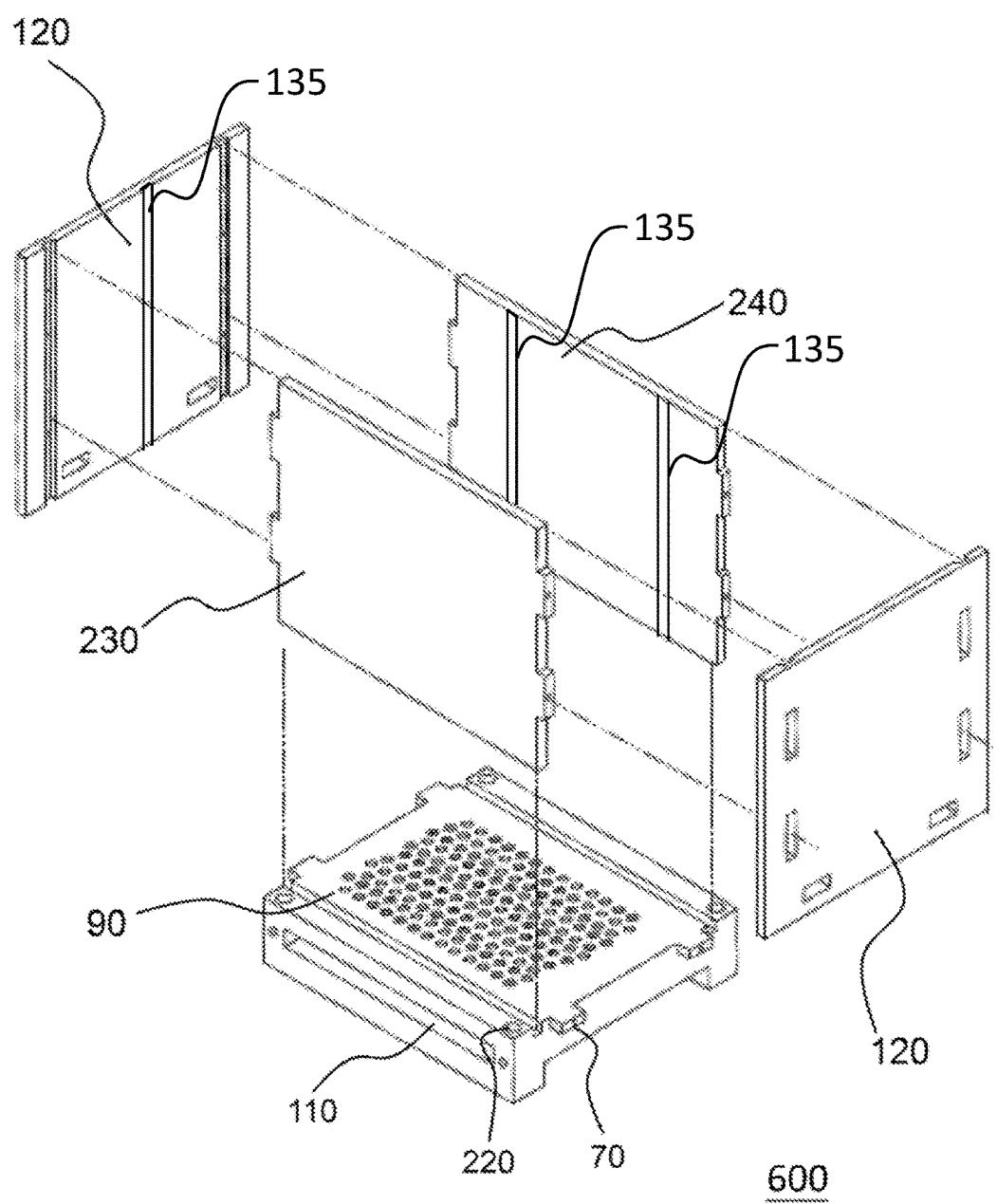
FIG. 11 shows a perspective exploded view of a pallet box according to a fourth embodiment.

When a seed carriage is placed on the PVC frame structure 100, it has the ability to rock back and forth so as not to disturb the seedlings during transportation or set at an angle for maximum sun exposure during the winter months in northern latitudes. The seed carriage can be suspended over the top edge of the pallet box 200, on a frame of ½ inch reinforced PVC pipe or aluminum tent poles. With the recessed holes 220 drilled on the top of the pallet base 90, the PVC pipes 40 can be inserted through the top of the pallet base 90, as shown in FIG. 11. In this way, a sturdy PVC frame 100 using PVC pipes 40 can be easily erected in a variety of configurations. The seed carriage can then be suspended over horizontal PVC pipes 40 thus achieving maximum aeration.

To achieve a low center of gravity and thus an easier planter box to move from place to place, the user will start seedlings on the top edge of the planter box. As the plants grow and are transplanted into pots, the largest plants will remain in the lowest carriage while the smallest and lightest plants will be moved upward onto higher carriages. To be clear, most of the plants germinated will not end up in the planter box, but rather in other pots or a garden plot. Only the most logical choices such as potatoes, carrots, onions, and ginger would be transplanted into the planter box itself. Please note, the pallet box 200 can be used as the planter box.

Referring to FIG. 8 and FIG. 9, a pallet box assembly 300 of a second embodiment includes a seed carriage assembly 170 inserted into the two semicircle grooves 50 on the side panels 120 in such a way so as the seed carriage assembly 170 may sway with tilting but is prevented from tipping over. The seed carriage assembly 170 offers the lowest center of gravity for a seed germination and starter plant array, thus offering an easily moved portable nursery terrarium "green house".

Figure 6:
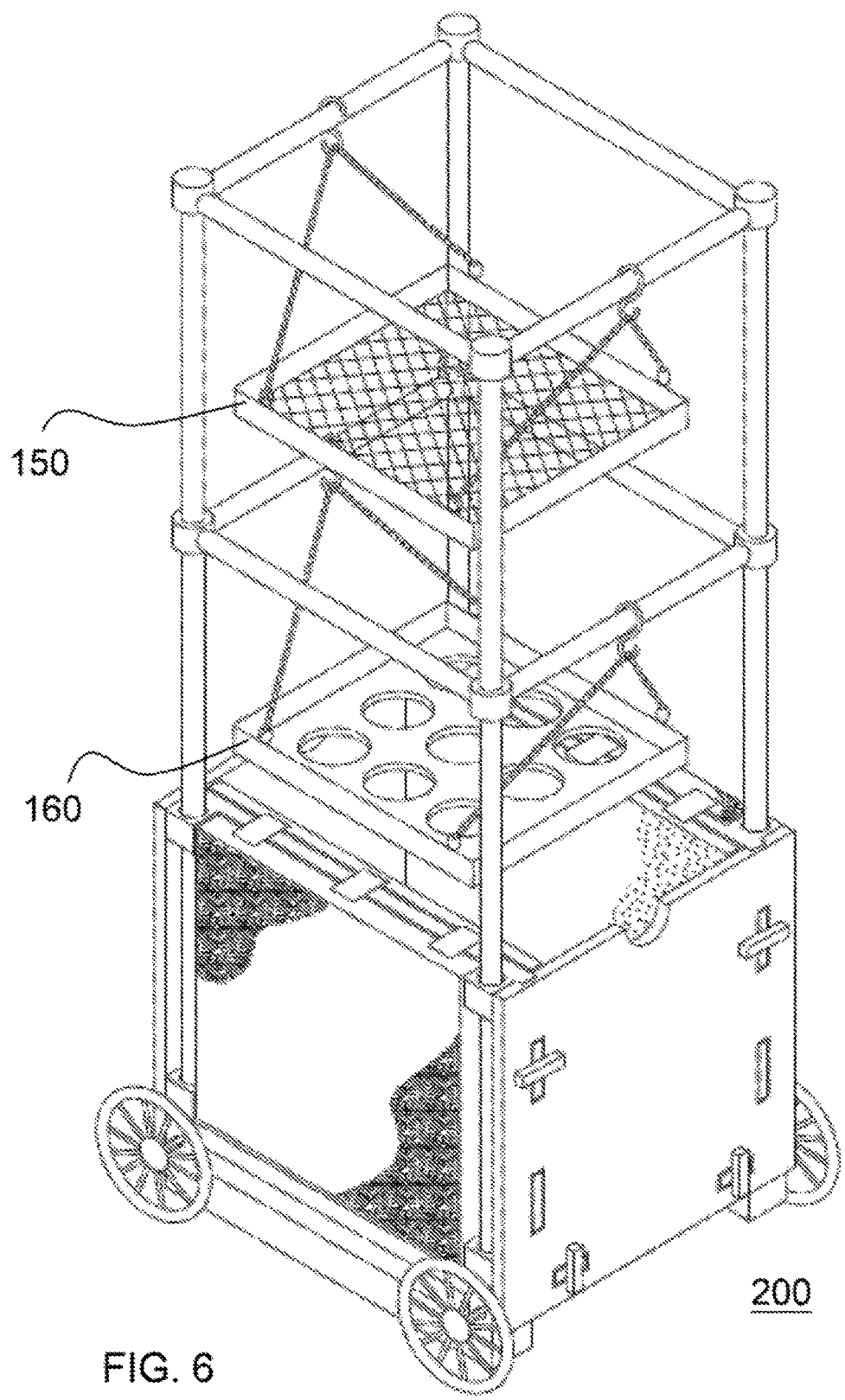
FIG. 6 shows a perspective view of the pallet box of the first embodiment being further installed with several rectangular hanging trays.

As the seedlings grow and are transplanted into larger pots, so the plant cultivation system can grow vertically and the smaller plants can be moved to upper carriage areas. Referring to FIG. 6, a variety of carriage trays 150, 160 for pots, starter flats, and germination trays can be arrayed in a variety of ways using the PVC frame structure 100. This is crucially important in plant growth due to the importance of aeration in the development of healthy root systems. Being suspended in the air by the mesh carriage 150 or the hole filled carriage tray 160 that suspends pots, starter flats, and germination trays in mid-air achieves a very high level of aeration which will certainly be appreciated.

Figure 7:
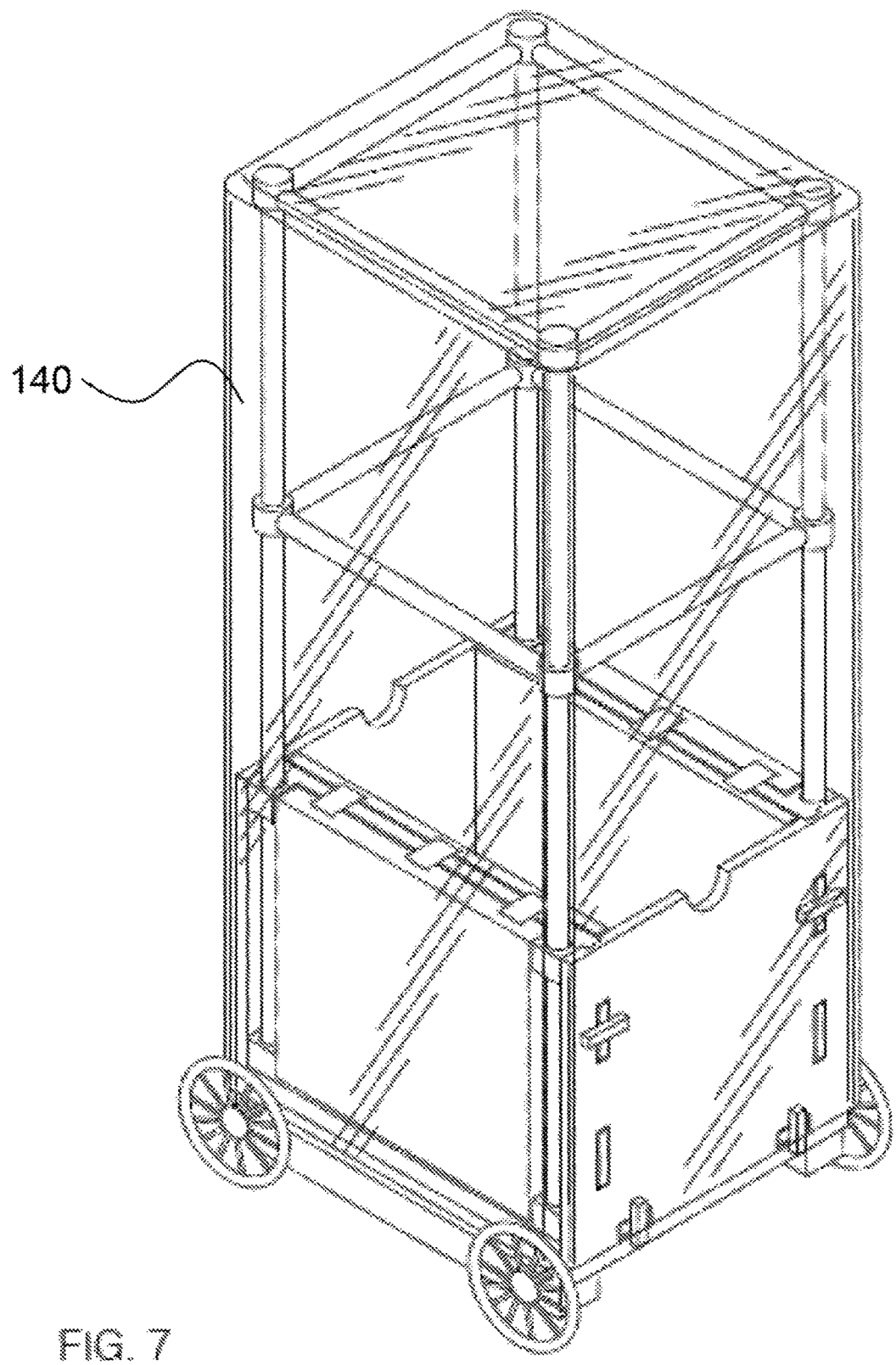
FIG. 7 shows a perspective view of the pallet box of the first embodiment being further installed with a clear canopy cover.

Referring to FIG. 7, a variety of materials can be draped over the frame creating a number of environments depending on the need. FIG. 7 illustrates a terrarium "greenhouse" being created by draping a thick poly bag 140 over the PVC frame structure 100. Depending on the need, other materials that are also readily available on the market can also be draped over the PVC frame 100 such as frost protection blanket, bird netting, and mosquito netting to mention just a few. With an insecticide applied to the base of the pallet box 200, and the plastic or mosquito netting covering the top of the pallet box 200, the plants will be safe from insects, birds, and small animals. This configuration is surely appreciated due to the damage caused by such pests. The PVC frame 100 can also include an assortment of nets, tarps, and seed trays, so as to include the sun/rain shelter.

For hot climates, a shading canopy 140 can be extended outwardly from the frame top to create an umbrella of shade which not only shades the plants within the pallet box 200 but also surrounding areas which may help shade other plants and people, that will surely be appreciated by the user.

In this embodiment, an optional feature can be formed by adding the aeration base 180, as shown in FIG. 4, into the pallet box 200. This aeration base 180 may have at the center region of the aeration base to be in the form of a slightly recessed drainage region. This optional feature will both promote healthy root growth and direct the majority of drainage over the drainage pan 190 and onto the sponge 195 respectively as shown in FIG. 4.

In alternative embodiments, the front, rear, and side panels can have a substantial amount of ornamental decorations, and each side of the respective panel can have either a lighter color, i.e. pale grey, or a darker color, i.e. dark brown. In general a lighter color is preferred so that the roots do not overheat in the summertime, but a darker color may be more conducive to late winter/early spring conditions when capturing radian heat is important. It should be noted that not only are side panels identical, but also interchangeable. With respect to the block attachments 80 at the front and rear panels, 230, 240, see FIG. 2, they are also interchangeable, and it should be noted that there are certain advantages to having the PVC framing on the inside or outside depending on the circumstances and needs.

For gardening purposes the side panels, the front panel, and the rear panel of the pallet box, all have a plurality of vertical grooves 135 formed on the inside surface of the side panels so as to encourage deep healthy root development as shown in FIG. 11. The vertical grooves 135 are spaced evenly therebetween.

In the illustrated embodiment of the pallet box 200 as shown in FIG. 3, the exterior foam insulation panel 10 and the interior natural matting panel 15 can be added over the panels, as seen in FIG. 3 as the insulation assembly 20. In this embodiment, the foam insulation panel 10 (which can have a high degree of decoration) and the matting panel 15 are linked by straps and folded over the top edge of the panel. An adhesive strip on the bottom edge of the foam panel 10 adheres the foam panel 10 to the outside of the panel of the pallet box 200. In this way, a high degree of insulation is achieved with the aesthetic benefit of a variety of patterns and decorative molding. With regard to the matting panel 15 shown in FIG. 3, it is similar in nature to an organic fiber doormat. It is made of a wire frame over woven with dense fiber such as hemp or coconut. The construction achieves the vertical grooves described herein, with a porous membrane between another set of vertical grooves, which creates airflow between the panel and the matting panel 15. In this way maximum aeration, water absorption, and directional deep root facilitation is all achieved with the same matting panel 15.

It should also be noted that when the contained plant becomes too mature for the pallet box assembly (serving as planter box) and needs to be transplanted, one can disassemble the side panels and easily remove the contained plant without damaging the root system. In general, larger plants with root bound conditions are usually damaged during transplant, but this type of damage would not occur with the pallet box (serving as planter box) because the side panels can be easily removed. In gardening applications, the pallet box 200 is superior for harvesting tubers, roots, and bulbous vegetables like potatoes, carrots, onions, ginger, etc., because the side panels can be disassembled, thus gaining easier side access to the vegetables in the soil.

According to another embodiment of present invention, a pallet box is adapted and configured for use as a workman's utility box (instead of a planter box). The workman's utility box could easily be transported to a remote job site. Moreover many construction workers are victims of theft, of which the workman's utility box would discourage theft of tools and equipment by providing a lockable storage box that is part of a sun and rain canopy system.

In this embodiment, there is an effect to create a weather resistant box with no drainage holes and a lockable lid, which protects fragile equipment such as electronics, computers, communication equipment, etc from damaging elements such as rain, dust, dirt, extreme temperatures, shock impacts, etc. In this embodiment, the framing suspends a sun and rain shelter, which creates a desirable workspace around the pallet box. Expensive and fragile equipment will be protected from the elements of weather by having them raised off the ground, covered by a sun and rain shelter, and housed inside the pallet box.

For a more mobile workstation the wagon version of the pallet box with a sun and rain shade added to the top of the frame creates a highly mobile work station that is sheltered from inclement weather while facilitating the transportation of tools, gear, and supplies into the field.

In another alternative embodiment of the framing, the use of strong magnets on the framing can create various utilities such as a positive alignment of the frame to the block attachments and a tool rack for metal tools similar to a magnetic kitchen knife strip.

In an alternative embodiment, the locking mechanism can be embodied by a modified conventional window lock that would cap the ends of the tenon, replacing the threaded winged bolts, and by modifying the shape of the window lock locking mechanism, a very strong low profile metal lock could be achieved. The recessed and lockable mechanisms would be very useful for the large sized touring vaults and shipping containers.

The pallet box offers the benefit of having a built-in pallet base, which is configured to be substantially identical to the bottom part of a conventional pallet, thereby allowing for convenient transporting by pallet jacks or forklifts, where as traditional large planters need to be used in conjunction with traditional pallets and yet are not attached in any way thus creating a more unstable unit. The pallet box of various embodiments of present invention uses less material, is far more stable, is collapsible and reusable, therefore it is environmentally friendly and easy to use.

Typically, standard pallets are being transported using various mechanical and motorized machines (fork lifts, pallet trucks, etc). Meanwhile, a smaller-sized pallet box assembly can be transported via a hand truck, garden wagon, or other such human powered means. In another preferred embodiment, a preferred shape for the pallet base for the smaller-sized pallet box assembly is rectangular instead of square.

The pallet box also has many applications in commercial agriculture. One of the advantages of the pallet box of the embodiments of instant disclosure is the convenient and flexible manner of which the side panels are connected to the pallet base and the front or rear panel are attached to the side panels and thus can be assembled or disassembled/removed without lifting or removing the contents carried inside the pallet box. As would be appreciated by an agricultural planter, the ease of assembly and disassembly capability of the pallet box of instant disclosure provides many benefits when it comes to removing or transplanting plants. With the pallet box, the side panels and the front and rear panels can be easily removed without causing trauma to the root system of the plant, and the pallet box functioning as a planter box can be used multiple times over several years.

Another advantage with the pallet box functioning as a planter box is that the contained plant can weight up to 200 pounds or 91 kilograms, or more and still be easily moved multiple times to different areas. Depending on the weather conditions, the plant along with the pallet box can be moved into direct sunlight, shade, or indoors. This is particularly useful in harsh weather climates or for staging various events such as weddings, concert performances, etc.

The pallet box is highly adaptable for many different applications and situations. In general, a typical 4 ft×4 ft pallet is useful for transporting heavy, large, or odd shaped objects because the object only has to be placed onto a pallet just once, and then it can be easily transported many times with minimal effort.

In a fifth embodiment, the pallet box can be adapted for usage for carrying and transporting shipped product, in which the pallet box assembly can be installed and configured with sensors for temperature, security, and tracking, yet this customized pallet box assembly can easily be disassembled, shipped flat, and reused many times. Thus, the pallet box of this embodiment, which is capable of disassembling into individual panels, allows for flat-packing of all of the respective panels for efficient shipping. Another advantage of this embodiment is that the product securely contained on the inside thereof can be inspected, tested, or even used without having to be taken off the pallet base thereof. This can be done multiple times using a minimal amount of effort, simply remove at least one or two panels.

In alternative embodiments, a large heavy item such as a water pump can be transported inside the pallet box assembly into the fields, and some of the panels can be removed without the large heavy item ever leaving the pallet base of the pallet box assembly (other heavy items include for example, generators, pumps, emergency equipment, military equipment, etc).

To aid in moving very heavy items, a removable ramp can be configured to one side of the pallet box assembly, so that very heavy items can be safely rolled or scooted onto the pallet. If the object has a tendency to roll or sway off the pallet, then the panels can be added so as to increase the safe transportation of the item.

Figure 10:
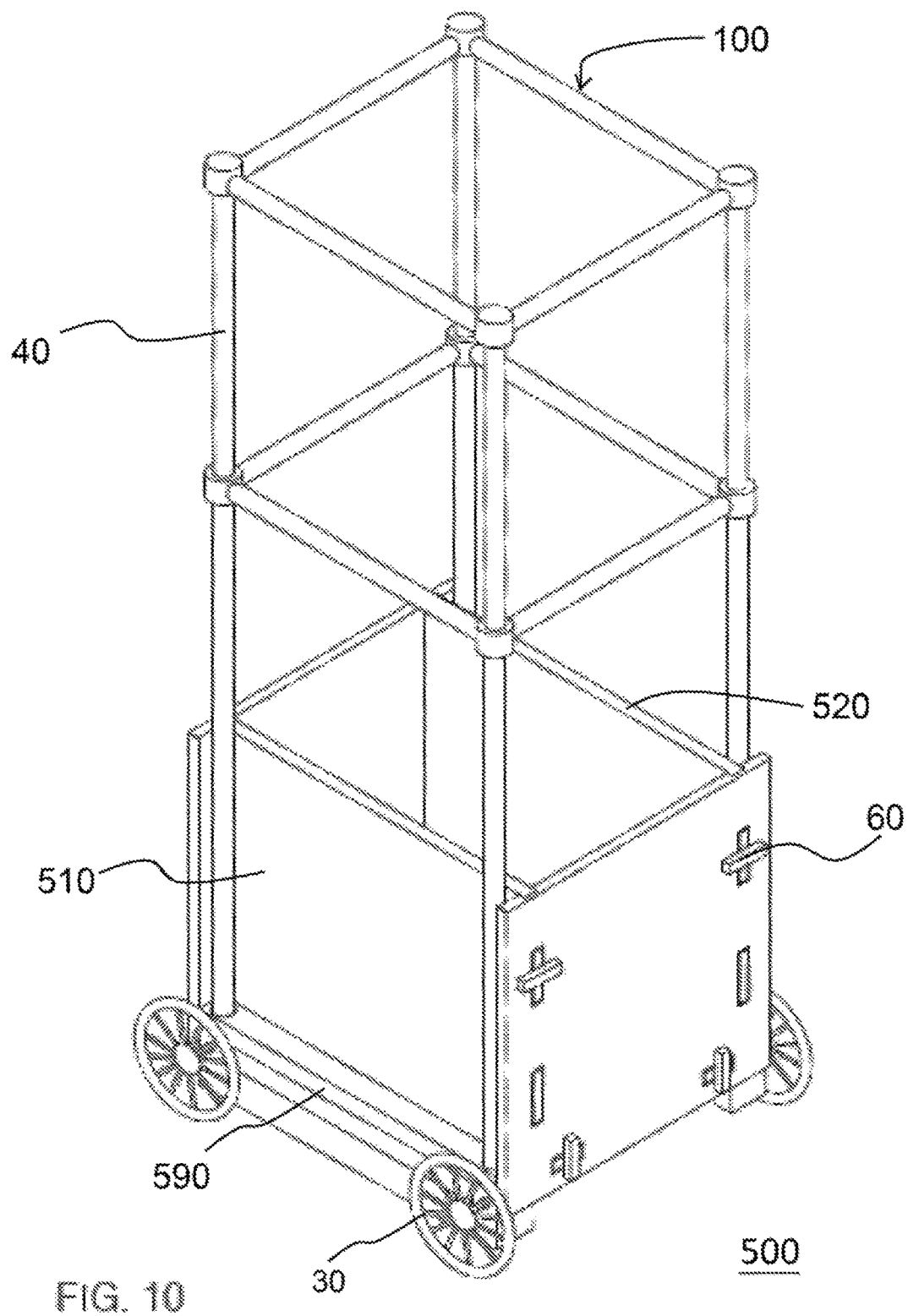
FIG. 10 shows a perspective assembly view of a pallet box according to a third embodiment.

In all embodiments of present invention, the essence of the pallet box has remained the same; a pallet, two identical side panels that affix to the pallet via a locking mechanism, and identical front and rear panels which affix to the side panels via a locking mechanism. Refer to FIG. 10, a pallet box assembly 500 according to a third embodiment is shown in which no attachment blocks are present, and the front panel 510, the rear panel 520, and the opening 590 are similar to the front panel 230, the rear panel 240, and the opening 110 of the first embodiment, respectively. Refer to FIG. 11, which shows a perspective exploded view of a pallet box assembly 600 according to a fourth embodiment. The primary function of the pallet base is to raise the base of the pallet base off the ground, which creates the clearance needed for the side panels to be attached. In the fourth embodiment as shown in FIG. 11, the locking mechanisms are identical to those of other embodiments, thereby they are omitted for brevity. This is a novel and unique method for creating a collapsible box, which is also easily transportable.

What is claimed is:

1. A planter box for housing plantings, comprising:
   a pallet base defined by a front edge, back edge, and two side edges; the pallet base comprising:
      four or more tenon joint parts that extend horizontally out from the two side edges of the pallet base;
      a first shallow border groove is disposed along the front edge of the pallet base and a second shallow border groove is disposed along the back edge of the pallet base;
      a first leg and a second leg, the first leg extends downwardly from and along the front edge of the pallet base, the second leg extends downwardly from and along the back edge of the pallet base, wherein the first leg and the second leg are parallel to one another;
      a first opening extending through the first leg in a direction from the front edge of the pallet base toward the back edge of the pallet base;
      a second opening extending through the second leg in a direction from the back edge of the pallet base toward the front edge of the pallet base;
      wherein the first and second openings provide two way entries for a lifting device to be inserted through the first and second openings;
      wherein the first leg is spaced apart from the second leg to form a third opening in a bottom portion of the pallet base, the third opening of the pallet base is a through opening extending from a first side edge to a second side edge of the two side edges of the pallet base;
   a front panel comprising one or more tenon joint part, wherein the front panel is received in the first shallow border groove;
   a rear panel comprising one or more tenon joint part, wherein the rear panel is received in the second shallow border groove;
   two side panels, each of the side panels includes four or more grooves, in which at least two of the grooves are horizontal grooves extending along and adjacent to a bottom edge of the side panel for receiving at least two of the four or more tenon joint parts of the pallet base to form tongue and groove joints, at least one of the grooves is a vertical groove extending along and adjacent to one edge of the side panel for receiving one of the one or more tenon joint part of the front panel to form at least one tongue and groove joint, and at least another one of the grooves is a vertical groove extending along and adjacent to another edge of the side panel for receiving one of the one or more tenon joint part of the rear panel to form at least one tongue and groove joint;
   wherein the front panel and the rear panel are configured to be positioned directly on top of the pallet base, the two side panels are configured to have all of bottom surfaces thereof raised above a ground surface;
   wherein each of the tongue and groove joints includes a locking mechanism, each of the locking mechanisms includes a long threaded winged bolt and a wing; wherein the long threaded winged bolt of each of the locking mechanisms is inserted through one of the grooves of the side panel and engaged into a respective one of the tenon joint parts of the front panel, the rear panel, and the pallet base;
   wherein the wing of each of the locking mechanisms engageably attach the respective one of the tenon joint parts in the one of the grooves of the side panel, thereby connecting the pallet base, the front panel, the rear panel and the side panels together;
   a PVC frame structure including a plurality of PVC pipes; and
   a plurality of attachment blocks are formed on each corner of the front panel and the rear panel, respectively;
   wherein the PVC pipes are inserted through the attachment blocks to be attached to the pallet base; and one or more carriage tray arranged on the PVC frame structure.

2. The planter box for housing plantings as claimed in claim 1, wherein the pallet base is made of plastic material or recycled plastic material constructed of single integral structure.

3. The planter box for housing plantings as claimed in claim 1, wherein the pallet base having a plurality of drainage holes formed.

4. The planter box for housing plantings as claimed in claim 1, wherein the wing of each of the locking mechanisms is rotated by about 45 degree to 135 degree to engageably and securely attach the respective one of the tenon joint parts in the one of the grooves of the side panel, thereby connecting the pallet base, the front panel, the rear panel and the side panels together to form a pallet box assembly.

5. The planter box for housing plantings as claimed in claim 1, wherein the pallet base is configured with an opening extending all the way therethrough from one side surface thereof adjacent to the front panel to another side surface thereof adjacent to the rear panel.

6. The planter box for housing plantings as claimed in claim 5, wherein the opening is configured to the pallet base of the pallet box assembly for ease of handling by pallet jack or hand truck.

7. The planter box for housing plantings as claimed in claim 1, wherein the front panel has two tenon joint parts that extend out from two side surfaces of the front panel, respectively.

8. The planter box for housing plantings as claimed in claim 1, wherein the rear panel has two tenon joint parts that extend out from two side surfaces of the rear panel, respectively, each of the two tenon joint parts includes one locking mechanism.

9. The planter box for housing plantings as claimed in claim 1, wherein the front panel has only one tenon joint part located at an upper portion of the front panel and the rear panel has only one tenon joint part located at an upper portion of the rear panel.

10. The planter box for housing plantings as claimed in claim 1, wherein all individual panels are capable of disassembling into individual panels for flat-packing.

11. The planter box for housing plantings as claimed in claim 1, wherein a plurality of axles are configured on the bottom of the pallet base at each corner thereof, for ease of attachment of a plurality of wheels to the pallet box, which are not fixed but detachable to the pallet box.

* * * * *